United States Patent
Wood et al.

[19]

[11] Patent Number: 6,120,109
[45] Date of Patent: Sep. 19, 2000

[54] ELECTRONIC EMERGENCY BRAKE LOAD WEIGH DEVICE

[75] Inventors: James A. Wood, Spartanburg; Richard J. Mazur, Greer, both of S.C.

[73] Assignee: Westinghouse Air Brake Company, Wilmerding, Pa.

[21] Appl. No.: 09/057,673

[22] Filed: Apr. 9, 1998

[51] Int. Cl.$^7$ ..................................................... B60T 8/18
[52] U.S. Cl. .................. 303/22.6; 303/7; 303/15
[58] Field of Search ............................. 303/3, 7, 9, 9.61, 303/9.69, 15, 22.6 R, 122.15, 122.03, 122.08, 128, 22.5, 22.4, 22.1; 188/195

[56] References Cited

U.S. PATENT DOCUMENTS

| | | | |
|---|---|---|---|
| 3,059,974 | 10/1962 | Van Der Sluys | 303/22.6 |
| 3,653,728 | 4/1972 | Sarbach | 303/22.6 |
| 4,402,047 | 8/1983 | Newton et al. | 303/3 |
| 4,453,777 | 6/1984 | Newton | 303/22.6 |
| 4,904,027 | 2/1990 | Skantar et al. | 303/15 |
| 5,549,362 | 8/1996 | Broome | 303/3 |
| 5,551,765 | 9/1996 | Sich | 303/7 |
| 5,735,579 | 4/1998 | Wood et al. | 303/7 |
| 5,788,339 | 8/1998 | Wood et al. | 303/7 |
| 5,887,953 | 3/1999 | Wood et al. | 303/7 |

*Primary Examiner*—Paul N. Dickson
*Assistant Examiner*—Thomas J. Williams
*Attorney, Agent, or Firm*—James Ray & Associates

[57] ABSTRACT

An electronic load weigh device is used with a railcar truck control unit. A relay valve provides to a brake cylinder a pressure proportional to the pressure impinging upon its control port. A first feedback signal is indicative of the pressure at the control port. A second feedback signal is indicative of the load borne by the truck. A pressure switch opens when pressure within a trainline changes to a level indicative of an emergency. By controlling the opening and closing of application and release magnet valves, a controller controls the pressure impinging on the control port and thereby service braking of the wheels of the truck. The load weigh device includes (i) circuitry for electronically compensating for the load during braking and (ii) a mechanism for granting the circuitry exclusive control over the magnet valves. Should such emergency occur, the mechanism responds to such emergency by disconnecting the controller from the magnet valves. This gives the circuitry exclusive control over the magnet valves. The circuitry compensates for the load borne by the truck during emergency braking by selectively opening and closing the magnet valves, according to predetermined criteria using the feedback signals, thereby controlling the magnitude of the pressure impinging upon the control port. Absent such emergency, the mechanism responds to such absence by connecting the controller to the magnet valves whereby such service braking on the truck is normally controlled, yet the circuitry is still enabled to compensate for the load during such service braking.

4 Claims, 7 Drawing Sheets

ELECTRONIC EMERGENCY BRAKE LOAD WEIGH DEVICE

CROSS-REFERENCE TO RELATED APPLICATIONS

This application is related to U.S. Pat. No. 5,788,339, entitled Universal Pneumatic Brake Control Unit. U.S. Pat. No. 5,788,339 is assigned to the assignee of the invention described and claimed below, and its teachings are incorporated by reference into this document.

FIELD OF THE INVENTION

The invention generally relates to a system for controlling the brakes of a railcar. More particularly, the invention pertains to a brake control unit capable of being used with many different types of electropneumatic brake control systems for controlling the brakes on one or more trucks of a railcar. Still more particularly, the invention pertains to a device that electronically compensates for the weight of the load borne by a railcar truck in formulating the braking effort to be applied to the wheels of that truck.

BACKGROUND OF THE INVENTION

A typical passenger transit or subway type train includes a locomotive, a plurality of railcars and several trainlines. The trainlines include both pneumatic and electrical lines most of which run from the locomotive to the last railcar in the train. The main reservoir equalization (MRE) pipe is one such pneumatic trainline. It consists of a series of individual pipe lengths. Secured to the underside of each railcar, one such pipe length connects via a coupler to another such pipe length secured to a neighboring railcar. The MRE pipe is thus essentially one long continuous pipe that runs from the locomotive to the last railcar. Charged by various air compressors located throughout the train, it is the MRE pipe that serves to supply air to the various reservoirs, such as the supply reservoir, located on each railcar in the train.

One pneumatic trainline of particular importance to passenger transit and subway type trains is the brake pipe. It is used to convey to each railcar in the train an emergency brake signal when an emergency condition arises. Of similar importance is the brake control trainline that is used to carry the brake command to each railcar in the train as discussed below. Contained within a protective conduit along with other electrical trainlines, the brake control trainline is similarly formed from individual conduits connected in series.

A locomotive for a passenger transit or a subway type train typically has an electropneumatic brake control system such as the RT-5 Brake Control System produced by the Westinghouse Air Brake Company (WABCO). Adapted or configured to fit the needs of various passenger transit authorities, each of the RT-5 style systems currently in service feature a master controller by which a train operator can direct the overall braking and propulsive efforts for the entire train.

The master controller in the locomotive houses a handle, a computer and various other related components. The handle can be moved longitudinally anywhere along its range of motion and into any one of several designated positions. By moving the handle into the appropriate position, a train operator can initiate, maintain or halt braking or propulsion of the train. For example, from a position in which the train is currently being propelled, moving the handle to what is referred to as the full service position causes a service application of the brakes. Similarly, when moved to the emergency position, the operator can initiate an even faster type of braking referred to as an emergency application of the brakes. There are other positions for the handle whose purposes are beyond the scope of the invention described and claimed below.

Based on the positions of the handle, the computer of the master controller can ascertain whether, and to what degree, the overall braking or propulsive effort of the train should be reduced or increased. A keyboard may also be used to permit the operator greater access to the brake equipment, allowing, for example, input of set-up parameters. Other known components may also be used to provide various other signals to the computer.

Based on the inputs it receives and the software that dictates its operation, the master controller essentially controls the overall operation of the brakes. For service braking, the master controller formulates the brake command appropriate to current conditions and conveys it along the brake control trainline to each of the railcars in the train. Through its brake command, the master controller can order any action from a release of brakes to a service application of the brakes or any degree of brake application in between those two extremes. For emergency braking, a push-button type emergency valve in the locomotive can be used to effect a drop in brake pipe pressure to an emergency level using both pneumatic and electrical means simultaneously. When push-actuated, the emergency valve provides a path for the brake pipe to vent directly to atmosphere. It also simultaneously deenergizes an emergency trainline thereby deenergizing one or more emergency magnet valves to further vent the brake pipe. Alternatively, when directed by the master controller, an emergency brake control valve on the locomotive could be used to decrease brake pipe pressure to the emergency level. By reducing the brake pipe pressure to the emergency level, whether initiated from the locomotive or from any other point in the train, this sends an emergency brake signal along the brake pipe to all other railcars in the train.

On passenger transit and subway type trains, the brake pipe is typically operated according to a binary logic scheme. Normal operating pressure for the brake pipe during non-emergency situations ranges from 130 to 150 psi, the pressure to which it is charged via the MRE pipe. The transition point, or emergency level, lies at approximately 90 psi. A pressure of 90 psi or below indicates an emergency. It is this lower pressure range that constitutes the emergency brake signal.

Each passenger transit railcar typically includes an electronic controller and two trucks, with each truck typically having two axles. In response to the brake command received from the master controller in the locomotive, the electronic controller controls the operation of both trucks on the railcar. The electronic controller, however, has two central processing units (CPUs). Along with its associated interface equipment, each CPU controls the brake equipment of one truck independently of the other truck. It does so based on the brake command and various other inputs specific to the truck that it controls.

Figure 1:
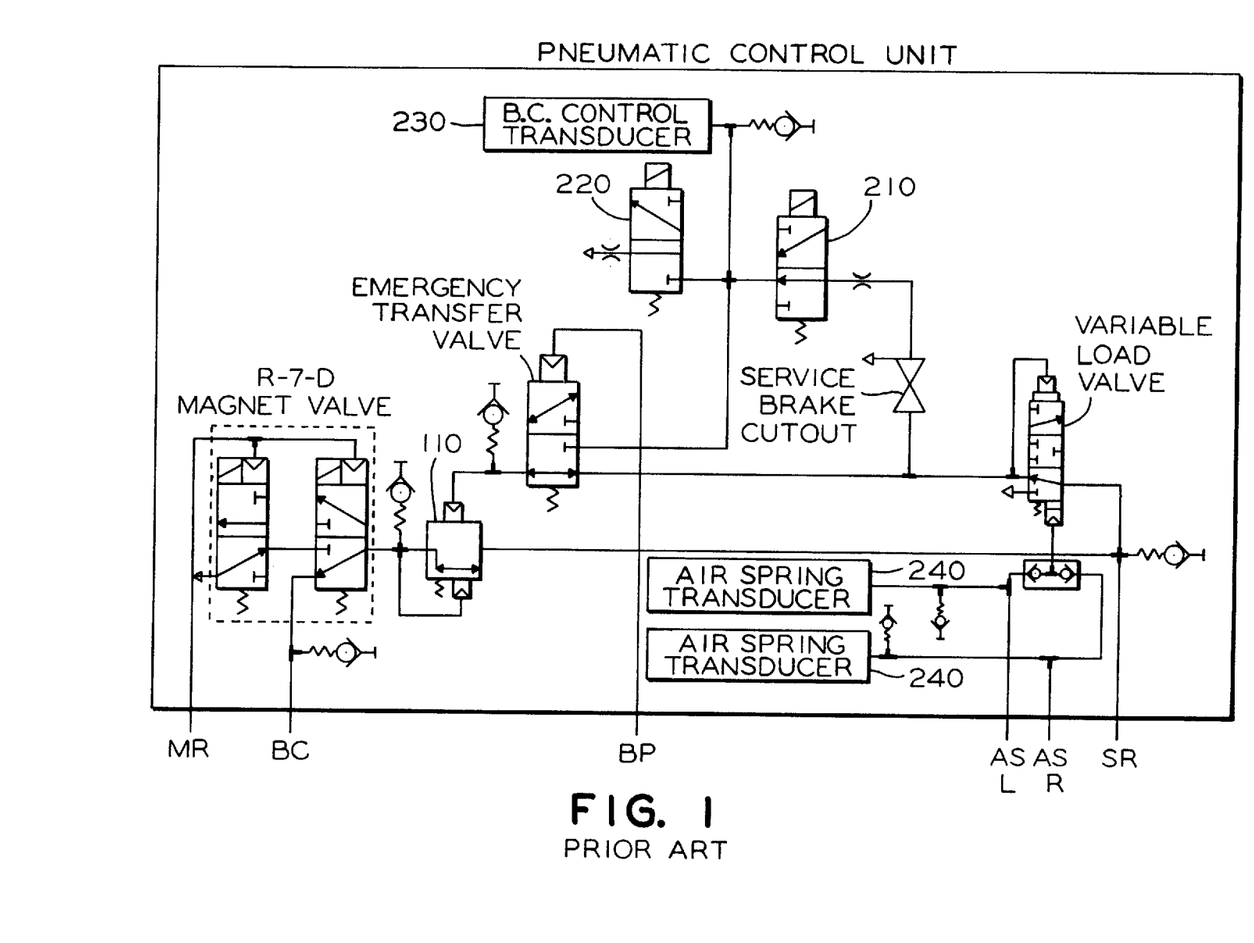
FIG. 1 is a schematic diagram of a pneumatic control unit that features a prior art variable load valve.

The brake equipment for a truck includes a pneumatic control unit and one or more pneumatically operated brake cylinders. Shown in FIG. 1, the pneumatic control unit typically houses an application magnet valve (AMV), a release magnet valve (RMV), a relay valve, an emergency transfer valve (ETV), a variable load valve (VLV) and an air spring pressure transducer. Used to convert the pressure received from a load sensing system on the truck, the air spring transducer provides a feedback signal indicative of the load borne by the truck.

The relay valve typically takes the form of a J-1 relay valve or similar type valve. It is an air piloted device whose construction and operation are well known in the brake control art. It features a control port connected to the ETV, a supply port supplied by the supply reservoir, an output port from which air can be directed from the supply reservoir to the brake cylinder(s) and an exhaust port from which to vent the brake cylinder(s) to atmosphere. The pressure of the air impinging upon its control port and the pressure of the air that the relay valve delivers to the brake cylinders will be approximately equal, though the air delivered by the latter will be in much greater quantity than that received by the former.

During non-emergency operation of the pneumatic control unit (i.e., when brake pipe pressure lies above the transition point), the ETV assumes an access state in which it connects the control port to both the AMV and RMV. The AMV when opened then allows air from the supply reservoir via the VLV to reach the control port. The RMV when opened allows whatever pressure that impinges on the control port to be vented to atmosphere. By selectively controlling the opening and closing of the AMV and RMV when the ETV is switched to the access state, the electronic controller can control the magnitude of the pressure received by the control port. A brake cylinder control transducer, also a part of the pneumatic control unit, converts the pressure at the control port to yet another feedback signal. Along with other signals such as those relating to speed, dynamic braking, wheel slip, the air spring feedback and others, this feedback signal is conveyed to the electronic controller to aid it in controlling each pneumatic control unit independently.

The electronic controller acts upon the brake command that it receives from the master controller in the locomotive. Specifically, during service braking, each CPU formulates the exact amount of braking effort appropriate for its truck. It does this by processing the brake command and the aforementioned other signals according to a brake control process whose specifics are beyond the scope of the invention described and claimed below. Operating in what can be referred to as a service braking mode when its ETV is switched to the access state, the pneumatic control unit has its AMV and RMV magnet valves controlled by their corresponding CPU; each magnet valve being energizable by the CPU with a field effect transistor (FET). By such control of the AMV and RMV magnet valves, the CPU can control the flow of air from the supply reservoir via the VLV and the AMV and RMV magnet valves to the control port via the ETV. This produces at the control port of the relay valve a low capacity pressure corresponding to the amount of braking effort formulated for that particular truck.

The pneumatic control unit operates in what can be referred to as an emergency braking mode when its ETV is switched to the bypass state. Specifically, in an emergency, the ETV responds to the emergency brake signal by pneumatically switching itself to the bypass state in which the AMV and RMV are cutoff from the control port. Air from the supply reservoir is then allowed to flow via the VLV through the ETV directly to the control port. Built at the control port of the relay valve in this manner is a low capacity pressure capable of initiating an emergency application of the brakes on the truck.

In response to whatever low capacity pressure is impinging on its control port, the relay valve provides to the brake cylinder(s) a corresponding pressure of high capacity. This compels the brake cylinder(s) to apply the brakes on the truck. The magnitude of the braking force applied to the wheels is directly proportional to the pressure built up in the brake cylinder(s). The brake cylinder(s) convert the pressurized air that they receive to mechanical force. This force is transmitted by mechanical linkage to the brake shoes. Forced against the truck wheels and/or disc brakes, the brake shoes are used to slow or stop the rotation of the wheels according to the braking effort sought via the brake command or the emergency brake signal.

Figure 2:
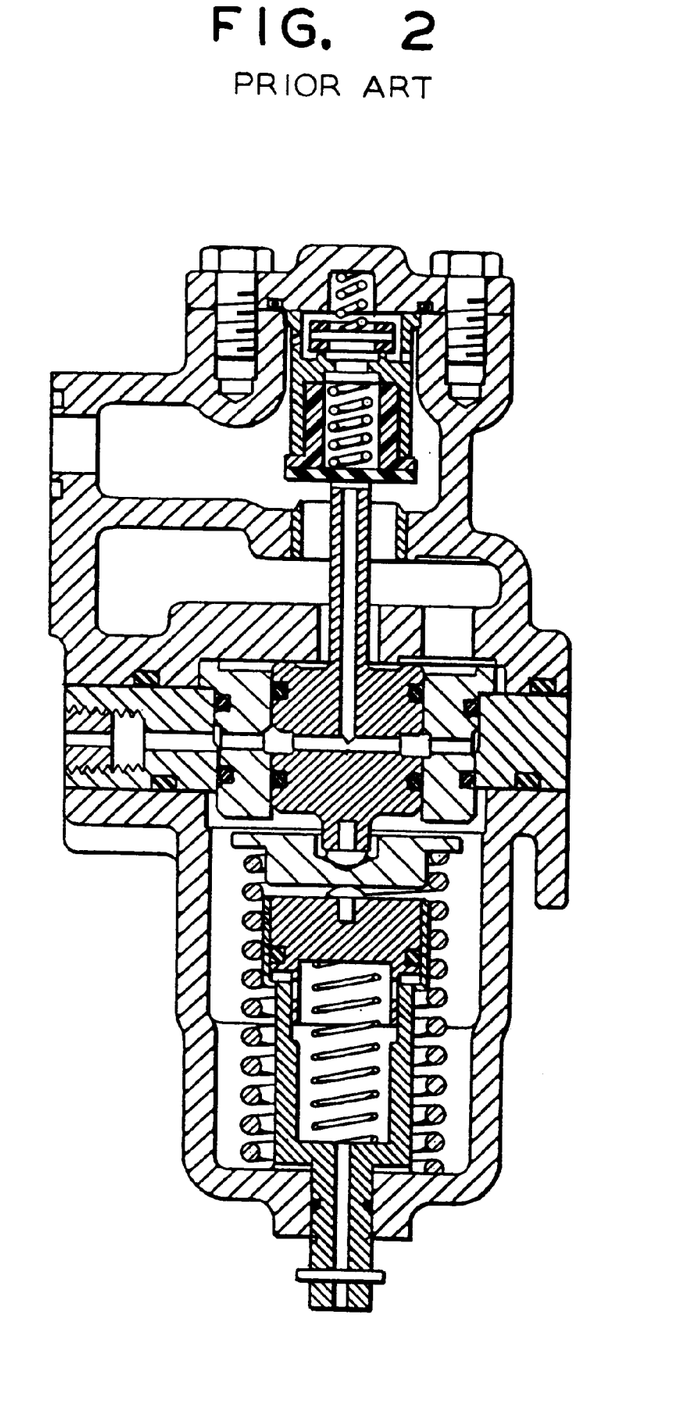
FIG. 2 is a cross-sectional view of the type of prior art variable load valve shown in FIG. 1.

It is also well known that the braking effort sought to be applied to wheels of a truck is often formulated to take into account the weight of the load borne by the truck through a process generally known as load compensation. This is the purpose of the VLV shown in FIGS. 1 and 2.

The variable load valve (such as that shown and described in Operation & Maintenance Publication 4229-1 published by WABCO) is an air piloted device whose construction and operation are well known in the brake control art. Entirely mechanical in nature, the VLV typically features two spring-biased piston assemblies, at least one of which adjustable, that are designed to work with the air pressure received from the load sensing system (i.e., air springs) on the truck. The magnitude of the air spring pressure is indicative of the load that the truck is currently carrying. The VLV is designed to limit the maximum pressure at which air from the supply reservoir is directed to the control port of the relay valve. This maximum control pressure level is proportional to the pressure that the VLV receives from the air springs. For any particular level of air spring pressure, the VLV determines the maximum allowable pressure that will be supplied to the control port of the relay valve in an emergency.

Regarding the combined operation of the VLV and the relay valve, when the pneumatic control unit operates in the emergency braking mode, its ETV is in the bypass state thereby bypassing the AMV and RMV valves and allowing air to flow from the VLV directly to the control port. The control port thus receives the maximum allowable pressure (i.e., emergency brake control pressure) that the VLV can provide based on the load that the truck is currently carrying. As is apparent from FIG. 3, the VLV is essentially set so that the emergency brake control pressure for an empty railcar is X psi and, for a fully loaded railcar it is (X+Y) psi. Though the emergency brake control pressure can vary from X to (X+Y) psi depending on the load borne by the railcar at any given time, it will never decrease below X or increase beyond (X+Y). The relay valve responds to the emergency brake control pressure by pressurizing the brake cylinder(s) to an emergency pressure level, a level determined by the setting of the VLV. When operating in the service braking mode with its ETV in the access state, the pneumatic control unit has its AMV and RMV valves controlled by their corresponding CPU. By manipulating the AMV and RMV valves according to aforementioned brake control process, the CPU produces at the control port a lower capacity pressure (i.e., a service brake control pressure) corresponding to the amount of braking effort formulated for that particular truck. The magnitude of the service brake control pressure is determined by the CPU according to the aforementioned brake control process. The relay valve responds to the service brake control pressure by pressurizing the brake cylinder(s) to a service pressure level, a level determined by the CPU and one that will never exceed the emergency brake control pressure setting of the VLV. In this manner, the VLV allows the truck to be braked at a relatively constant rate under fluctuating passenger loads.

The variable load valve has certain disadvantages when compared to the invention described and claimed below. First, the VLV is inherently compromised in its reliability due to its purely mechanical nature. It is a device that necessarily requires many parts, properly assembled and maintained, to perform its intended function, each part being subject to mechanical wear and tear. Second, the VLV occupies a comparatively large amount of space in, and adds weight to, the system into which it is incorporated. The pneumatic piping that is necessary to connect the VLV to and from the pneumatic components in the system in which it is employed also occupies space in, and adds weight to, the system. The design of the VLV has basically reached its zenith, it cannot be feasibly reduced much in size or in weight. Weight and space are two especially important factors in the rail industry where the costs of fuel and the capability to transport cargo or passengers affect the viability of railroad and passenger transit authorities alike.

The foregoing background information is provided to assist the reader to understand the invention described and claimed below. Accordingly, any terms used herein are not intended to be limited to any particular narrow interpretation unless specifically stated otherwise in this document.

OBJECTIVES OF THE INVENTION

It is, therefore, an objective of the invention to provide a device that electronically compensates for the load borne by a railcar truck in formulating the braking effort to be applied to the wheels of that truck during an emergency.

Another objective of the invention is to provide an electronic brake load weigh device for use with a truck control unit of a railcar to enable the truck control unit to compensate for the load borne by the truck during braking operations.

Yet another objective is to provide an electronic brake load weigh device that is far more reliable, smaller in size, lighter in weight, less likely to need maintenance and less costly than prior art mechanical apparatus used to perform the brake load weigh function on a truck of a railcar.

Still another objective is to add to a truck control unit an electronically implemented brake load weigh device that allows easier diagnosis of faults in the device and the annunciation of those faults to an appropriate apparatus.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

In a presently preferred embodiment, the invention provides an electronic brake load weigh device for use with a truck control unit of a rail vehicle. The truck control unit has a relay valve, application and release valves, first and second transducers, a pressure switch and an electronic controller. The relay valve provides to a brake cylinder a pressure proportional to the control pressure that impinges upon a control port of the relay valve. The first transducer converts the control pressure at the control port to a first feedback signal. The second transducer converts the pressure received from a load sensing system to a second feedback signal indicative of the load borne by a truck of the rail vehicle. Normally closed, the pressure switch opens when the pressure within a pneumatic trainline of the rail vehicle changes to a level indicative of an emergency. By controlling the opening and closing of the application and release valves and thereby controlling the control pressure impinging on the control port, the electronic controller controls service braking of the wheels on the truck. The electronic brake load weigh device includes first and second amplifier circuits, lower and upper level detector-driver circuits, and a means for giving the detector-driver circuits exclusive control over the application and release valves. The first amplifier circuit conditions the first feedback signal received from the first transducer and produces therefrom a first conditioned signal. The second amplifier circuit amplifies and offsets the second feedback signal received from the second transducer and produces therefrom a second conditioned signal appropriate for comparison with the first conditioned signal. The lower level detector-driver circuit commands the application valve to (i) close when the first conditioned signal is equal to or greater than the second conditioned signal and (ii) assume a normally open default state otherwise. The upper level detector-driver circuit commands the release valve to (i) open when the first conditioned signal is greater than the second conditioned signal by at least a preset amount and (ii) assume a normally closed default state otherwise. The detector-driver circuits command the application and release valves to hold pressure at the control port within a range appropriate for empty rail vehicles when the second conditioned signal indicates the truck bears no load. The giving means is controlled by operation of the pressure switch. When opened, the pressure switch compels the giving means to disconnect the electronic controller from the application and release valves thereby giving the detector-driver circuits exclusive control of the application and release valves. This enables the detector-driver circuits to compensate for the load borne by the truck during emergency braking. When closed, the pressure switch empowers the giving means to connect the electronic controller to the application and release valves by which the service braking on the truck is normally controlled. The detector-driver circuits are still enabled to compensate for the load borne by the truck during the service braking.

DETAILED DESCRIPTION OF THE INVENTION

Before describing the invention in detail, the reader is advised that, for the sake of clarity and understanding, identical components having identical functions have been marked where possible with the same reference numerals in each of the Figures provided in this document.

Furthermore, the invention—an electronic brake load weigh device—is described in the ensuing text as if incorporated into a truck control unit for a passenger transit railcar. Despite being described in this context, it should be apparent from a reading of this document that the invention may be incorporated into other types of vehicles on which the brake equipment may be configured differently from what is described in this document. The invention presented is in this context not to limit its scope but merely to simplify the description, and consequently the understanding, of the invention.

Figure 4:
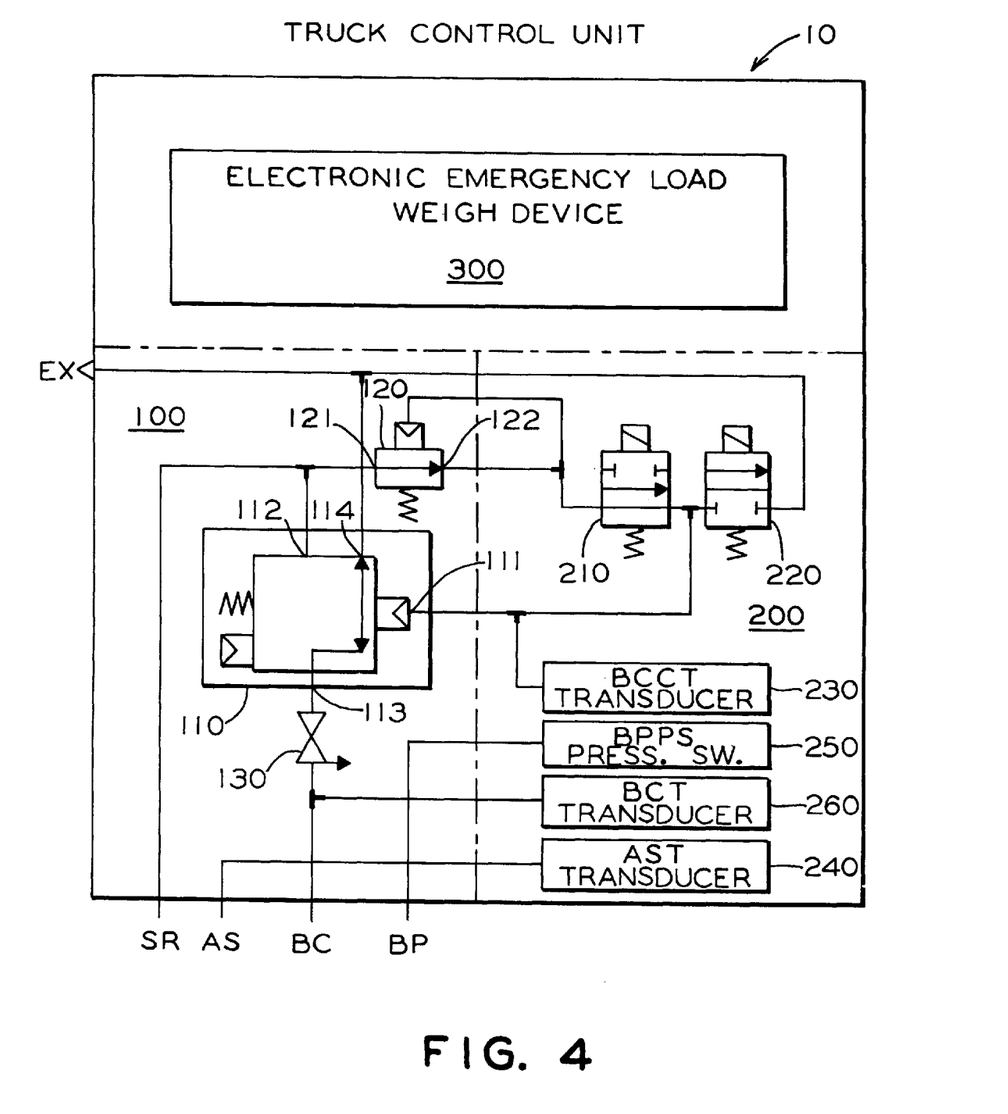
FIG. 4 is a partial schematic diagram of a truck control unit that features an electronic brake load weigh device according to the invention.
Figure 5A:
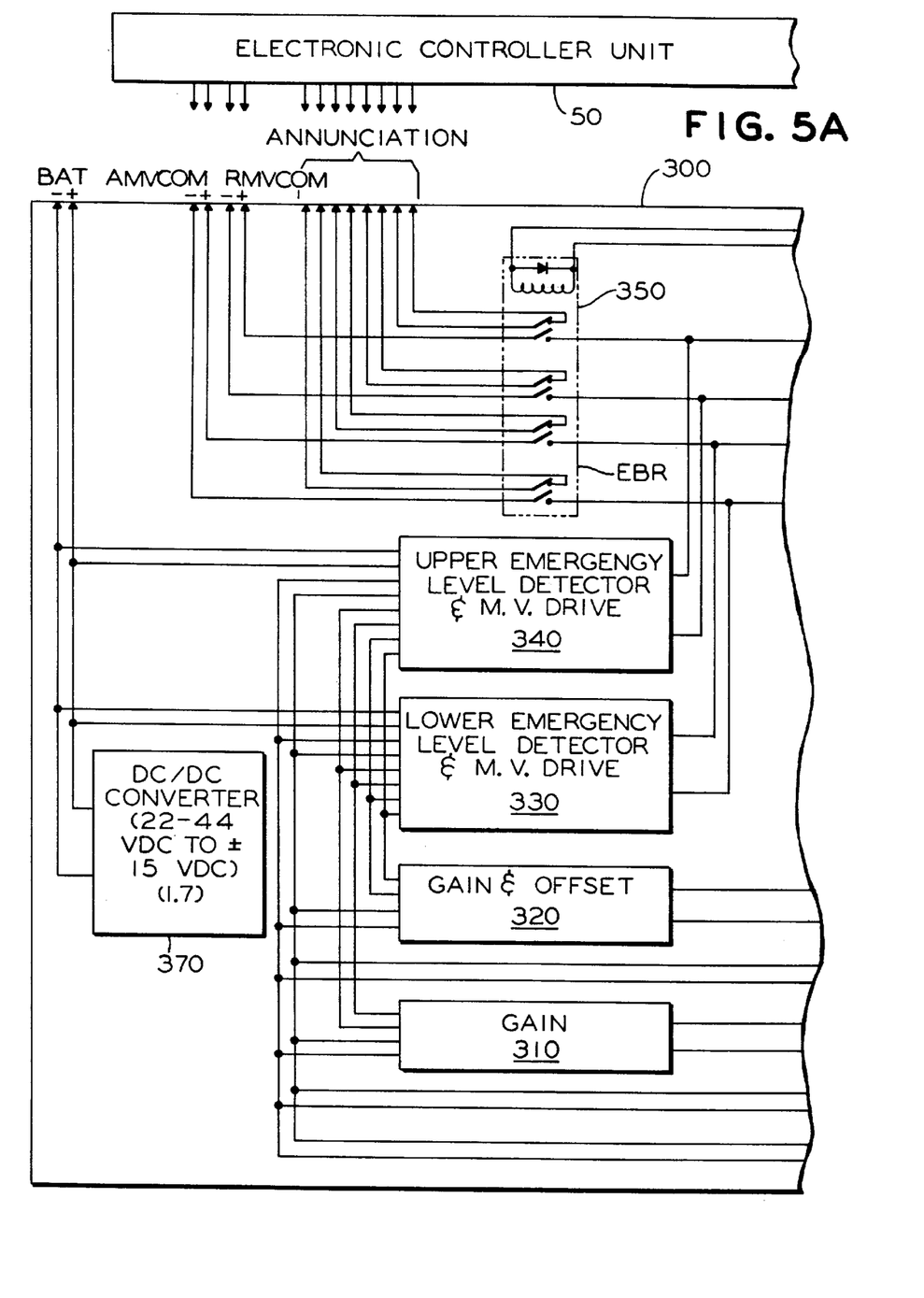
FIG. 5 is a schematic diagram showing the electronic brake load weigh device incorporated in the truck control unit of FIG. 4 and connected to an electronic controller that normally controls the truck control unit during non-emergencies.
Figure 5B:
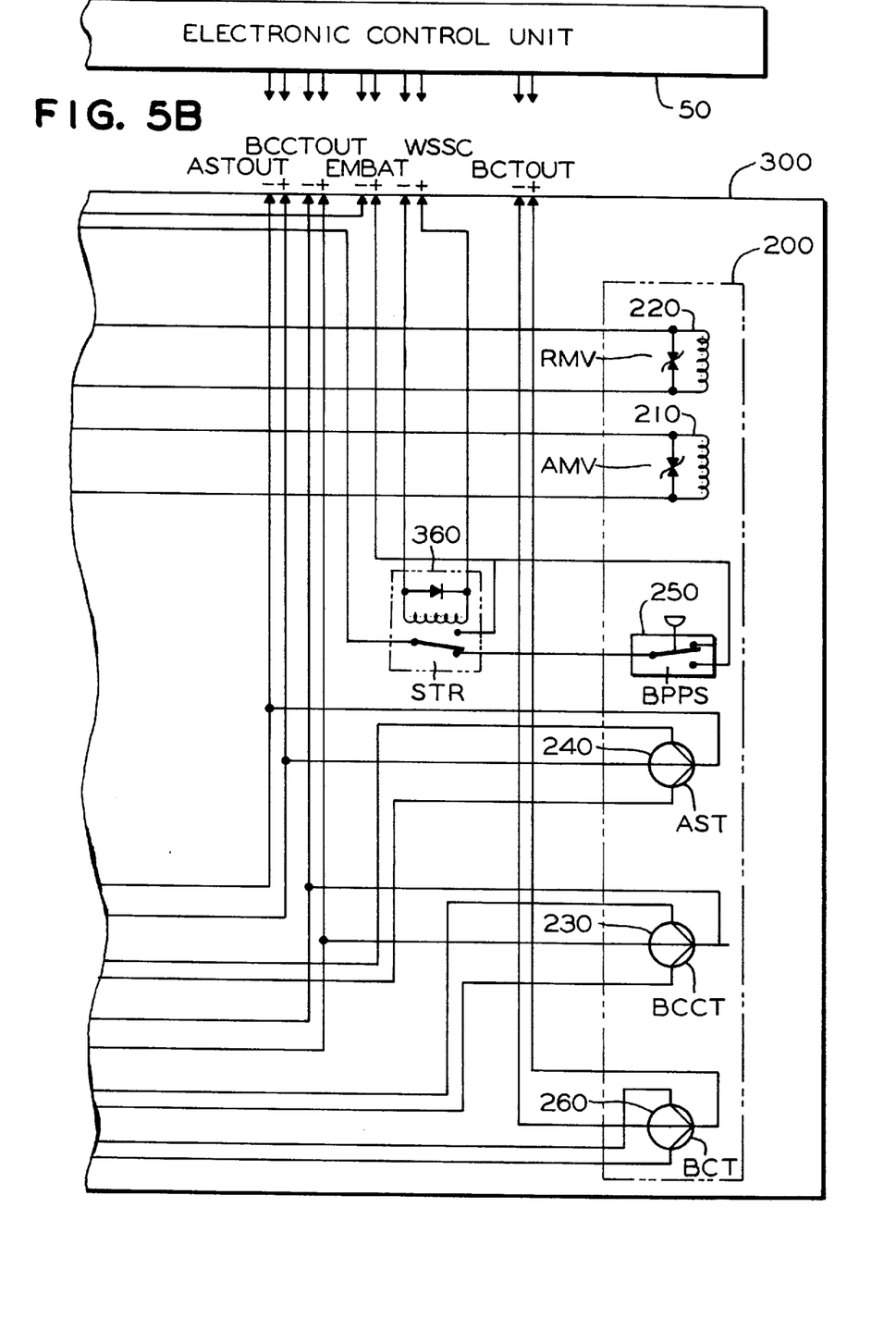
Figure 6:
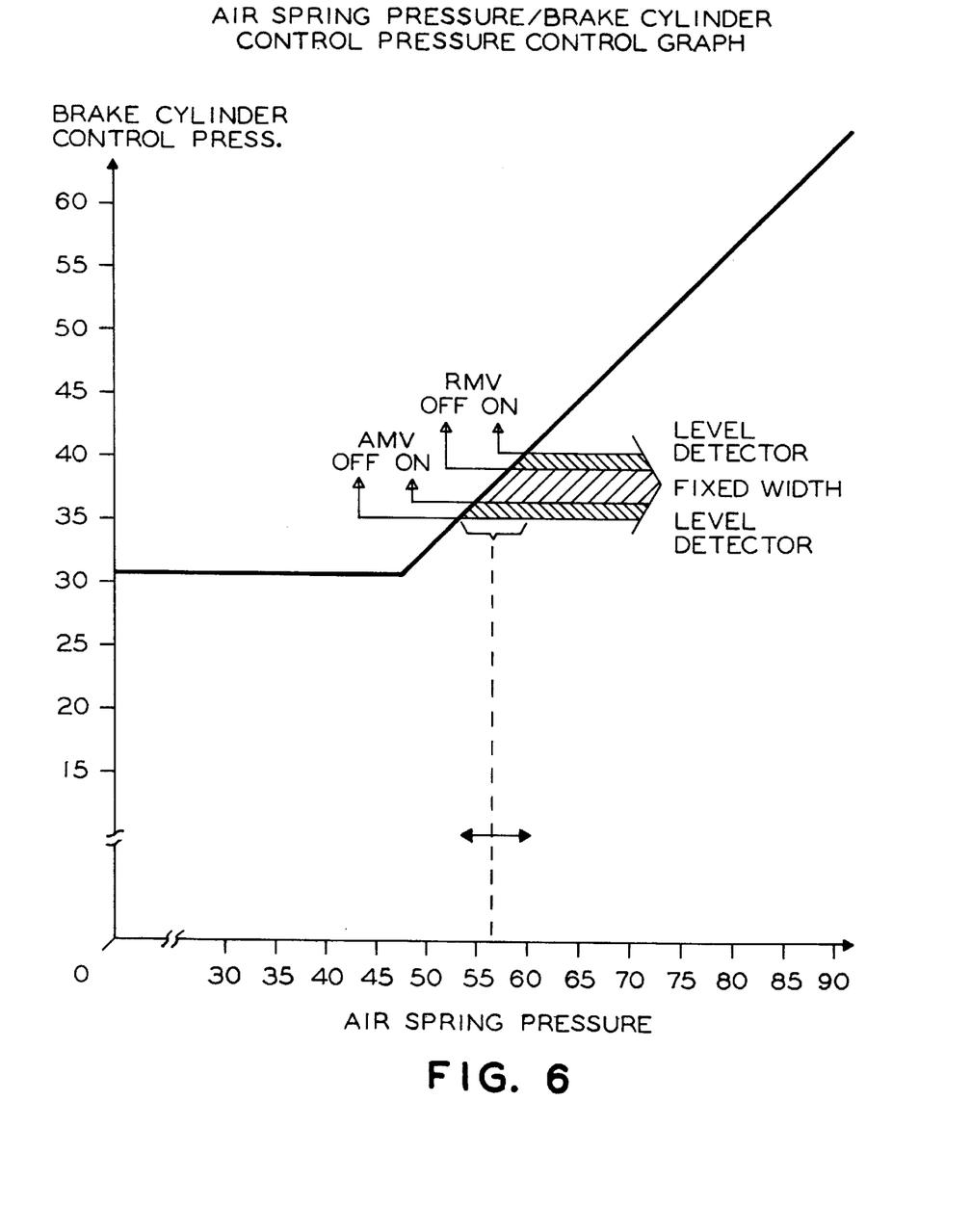
FIG. 6 is a graph showing an example of the predetermined criteria that the electronic brake load weigh device shown in FIG. 5 may employ in operation.

FIGS. 4–6 illustrate the essential details of a truck control unit that features the electronic brake load weigh device. As part of the equipment used to control the braking on one truck of a railcar, the truck control unit 10 has three sections: a pneumatic section 100, an electropneumatic section 200 and an electronics section 300. Akin to the pneumatic components of the pneumatic control unit described in the background section of this document except not requiring the VLV and ETV valves, the pneumatic section 100 includes a relay valve 110 and a pressure limiting valve (PLV) 120.

The relay valve 110 may take the form of a J-1 relay valve or similar type valve known in the brake control art. As shown in FIG. 4, the relay valve features a control port 111, a supply port 112 supplied by a supply reservoir, an output port 113 from which air ultimately from the supply reservoir can be directed to the brake cylinder(s) and an exhaust port 114 from which to vent the brake cylinder(s) to atmosphere. By design, the pressure of the air that the relay valve delivers from its output port 113 to the brake cylinder(s) approximately equals the pressure that impinges upon its control port 111. The quantity of air it delivers to the brake cylinder(s) is much greater than the quantity of air received by its control port.

The PLV 120 may take the form of any one of a variety of pressure limiting valves known in the brake control art such as the one shown and described in WABCO O & M Publication 4237-65. The PLV is an adjustable device capable of being set to deliver a maximum pressure selected from a range encompassing approximately 30 to 100 psi. The PLV 120 features an input port 121 supplied by the supply reservoir and an output port 122 from which air at this maximum pressure level is delivered. The pressure of the air supplied by the supply reservoir is approximately 130 to 150 psi on the passenger transit trains for which this invention is ideally suited. For a passenger transit railcar, the PLV is ideally set so that it can deliver a pressure capable of initiating an emergency application of brakes on a truck when the railcar is maximally loaded. It is this emergency brake control pressure that the invention conveys to the control port 111 of relay valve 110 during an emergency.

Optionally, the pneumatic section 100 may also include a brake cut out valve (BCOV) 130 interposed between the relay valve and the brake cylinder(s) for maintenance purposes. The BCOV 130 may be installed in the pneumatic piping that interconnects the output port 113 of relay valve 110 and the brake cylinder(s) of the truck. Using the BCOV 130, the brakes of the truck may be cut-out (i.e., rendered inoperable). Manually operated, the BCOV is a normally open valve that may be closed by a railyard worker should a problem with the brakes of the truck be detected after the train departs from a station. By closing the BCOV 130, air is prevented from flowing from the relay valve 110 to the brake cylinder(s) of the truck thereby depriving the truck of its ability to be braked. Each BCOV on the railcar can thus assume an open position wherein the brakes of its truck are cut-in or a closed position wherein the brakes of its truck are cut-out. Even though a few trucks may have their brakes cut-out, a train can still operate safely as long as the number of affected trucks is not excessive.

Like the pneumatic control unit described in the background section, the electropneumatic section 200 features an application magnet valve (AMV) 210 and a release magnet valve (RMV) 220, both normally under the control of the electronic controller 50 of the railcar. The AMV and RMV valves both connect to the control port 111 of relay valve 110. As explained in detail in the following paragraphs, the AMV and RMV magnet valves are controlled during non-emergency situations by their corresponding CPU in the electronic controller 50.

The electropneumatic section 200 also has three pressure transducers and a pressure switch. The first transducer 230, the brake cylinder control transducer (BCCT), converts the pressure resident at the control port 111 of relay valve 110 to a first feedback signal. The second transducer 240, the air spring pressure transducer (AST), converts the pressure received from a load sensing system on the truck. As the load sensing system is comprised of air springs, the second feedback signal is indicative of the pressure endured by those air springs and thus the load borne by the truck. As shown in FIG. 5, these feedback signals are fed to the electronic controller 50 via the BCCTOUT and ASTOUT terminals. The pressure switch 250 responds to the pressure contained in the pneumatic trainline that is used to carry the emergency brake signal. As used in a preferred embodiment of the invention on a passenger transit railcar, this pressure switch opens when pressure in the brake pipe drops to an emergency level of approximately 90 psi. A rise in pressure within the brake pipe above this emergency level causes the pressure switch to close.

The third transducer that the electropneumatic section 200 may feature is a brake cylinder transducer (BCT) 260. This transducer is used to convert the pressure at the output port 113 of relay valve 110 to a third feedback signal indicative of the pressure in the brake cylinder(s) of the truck. As shown in FIG. 5, this feedback signal is fed to the electronic controller 50 via the BCTOUT terminals. It is typically to be used by the CPU of the electronic controller that is responsible for controlling the AMV 210 and RMV 220 of the truck control unit during non-emergency situations. Along with the brake command received from the master controller and the aforementioned other signals, the CPU can use this third feedback signal to formulate the exact amount of braking effort appropriate for the truck over which it has control.

The CPU derives the braking effort by processing those signals according to the aforementioned brake control process, the specifics of which not being necessary to understand the invention. With the RMV in its normally closed (i.e., deenergized) state and the AMV in its normally open (i.e., deenergized) state, the magnet valves compel relay valve 110 to assume an APPLY STATE. In this state, air flows from the output port of PLV 120 to the control port 111 of relay valve 110. As pressure builds at the control port, the relay valve 110 provides pressure to the brake cylinder(s) of the truck. Because the relay valve builds pressure at its output port 113 to a level that essentially equals that impinging on its control port, the brake cylinders on the truck will continue to pressurize as long as the magnet valves are held in the APPLY STATE. If the magnet valves are held in the APPLY STATE, the rise in brake cylinder pressure will eventually stop at the level dictated by the setting of the PLV 120. With the RMV closed, the CPU can energize (i.e., close) the AMV 210 via its corresponding FET to prevent air from flowing to the control port 111. Controlled in this manner, the magnet valves place the relay valve 110 in a LAP STATE wherein pressure is held constant at the control port. This causes relay valve 110 to hold the pressure in the brake cylinder(s) at a level that corresponds to that impinging upon its control port. Furthermore, by energizing both the AMV and RMV via their respective FETs, the CPU can close the AMV and open the RMV so as to place relay valve 110 in a RELEASE STATE wherein the pressure at the control port vents to atmosphere. Relay valve 110 responds by reducing correspondingly the pressure held in the brake cylinder(s) of the truck as long as the magnet valves are held in the RELEASE STATE. Once pressure at the control port falls below a minimal level, the relay valve responds by completely venting the brake cylinder(s) to atmosphere.

Figure 3:
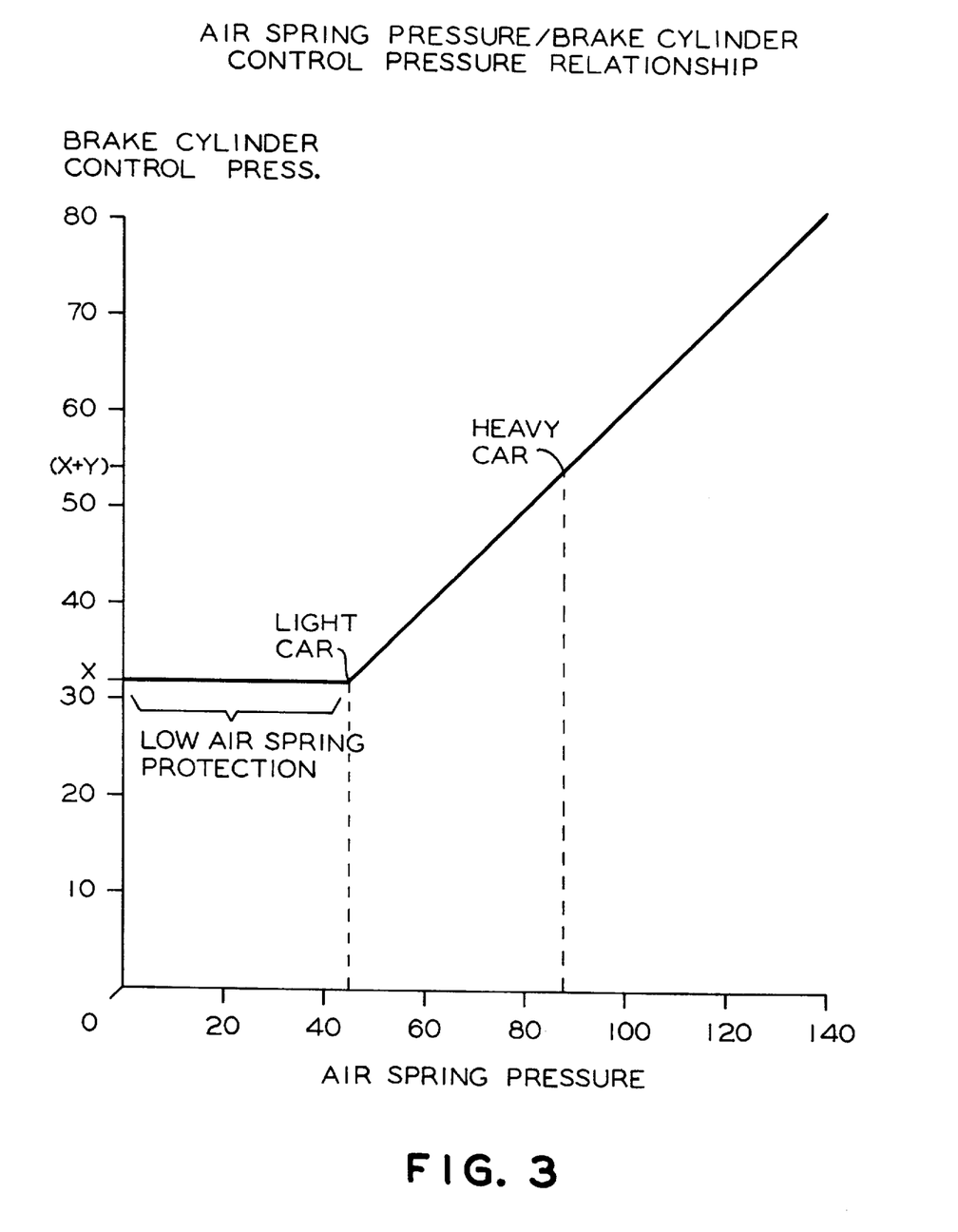
FIG. 3 is a graph showing the typical relationship that a load weigh apparatus achieves between air spring pressure and brake control pressure on a truck of a railcar.

Referring to FIG. 5, the electronics section 300 of the truck control unit houses the electronic brake load weigh device. It includes two amplifier circuits 310 and 320, two level detector/driver circuits 330 and 340 and an emergency brake relay (EBR) 350. Each amplifier circuit features a linear amplifier whose output current is directly proportional to the changes in the applied input voltage coming from its corresponding transducer. The first amplifier circuit 310 is used to condition the first feedback signal received from the BCCT 230 to produce a first conditioned signal. Similarly, the second amplifier circuit 320 is used to condition and offset the second feedback signal received from the AST 240 to produce a second conditioned signal. Given the way in which the brake equipment and load sensing system is configured on the typical passenger transit railcar truck, the air spring pressure feedback signal must be offset by a preset fixed percentage. This is so that the intensity of the resulting second conditioned signal is appropriate for comparison with the first conditioned signal, the latter signal being representative of the control pressure currently impinging on the control port. FIG. 3 illustrates an example of the gain and offset sought by the second amplifier circuit and the resulting relationship that is preferred between the air spring pressure and the brake cylinder control pressure on a passenger transit railcar.

Having rendered the signals from the BCCT 230 and AST 240 transducers appropriate for comparison, the amplifier circuits pass the first and second conditioned signals to both of the lower and upper detector-driver circuits 330 and 340. Each detector-driver circuit features a comparator circuit and a field effect transistor (FET). Each comparator circuit (not shown) turns on or off its corresponding FET according to predetermined criteria that employs the first and second conditioned signals. Each FET (not shown), in turn, is used to drive one of the magnet valves in the electropneumatic section 200 of the track control unit. As shown in FIG. 5, the output of the lower level detector-driver circuit 330 connects directly to the power and return lines of the AMV 210. Likewise, the output of the upper level detector-driver circuit 340 connects directly to the power and return lines of the RMV 220.

Regarding the predetermined criteria according to which the magnet valves can be controlled by the electronics section 300, the lower level detector-driver circuit 330, according to a first part of the criteria, closes (i.e., energizes) the AMV when the first conditioned signal is equal to or greater than the second conditioned signal. Otherwise, the AMV 210 defaults to its normally open (i.e., deenergized) state. The upper level detector-driver circuit 340, according to a second part of the criteria, opens (i.e., energizes) the RMV when the first conditioned signal is greater than the second conditioned signal by at least a preset amount. Otherwise, the RMV defaults to its normally closed (i.e., deenergized) state.

Together the amplifier and detector-driver circuits essentially comprise a means for electronically compensating for the load borne by the truck during braking. By selectively opening and closing the AMV and RMV magnet valves according to the predetermined criteria, this load compensation means can control the magnitude of the pressure impinging upon the control port 111 of relay valve 110. By commanding the AMV and RMV to open and close, respectively, the load compensation means places the relay valve in the APPLY STATE. By commanding the AMV and RMV to close, the load compensation means compels the relay valve to assume the LAP STATE. By commanding the AMV and RMV to close and open, respectively, the load compensation means forces the relay valve to assume the RELEASE STATE. FIG. 6 illustrates an example of the predetermined criteria that the electronic brake load weigh device may employ in operation.

The emergency brake relay (EBR) is connected between the electronic controller 50 of the railcar and the AMV and RMV magnet valves of the truck control unit. The EBR 350 features a set of normally open contacts and a set of normally closed contacts, with each normally closed contact paired, and designed to move, with one normally open contact. As shown in FIG. 5, each normally open contact is incorporated within one of the conductive paths that electrically interconnects the electronic controller 50 and the AMV and RMV magnet valves. Specifically, one normally open contact is incorporated within the power line that interconnects the AMV 210 and the FET of its corresponding CPU in the electronic controller. Another normally open contact is incorporated within the return line that interconnects that FET and the AMV. Likewise, one normally open contact is incorporated into the power line that interconnects the RMV 220 to the other FET controlled by that CPU. Another normally open contact is incorporated into the return line that connects that second FET to the RMV 220. As shown in FIG. 5, preceding the normally open contacts, these power and return lines feed into the electronic controller 50 via the AMVCOM and RMVCOM terminals. Each normally closed contact is incorporated into a feedback circuit that is used by the electronic controller 50 primarily to ascertain the status of the normally open contact with which it is paired. The feedback circuits feed into the electronic controller 50 via the ANNUNCIATION terminals.

Energizing the coil of the EBR 350 causes the normally open contacts to close and the normally closed contacts to open. When the normally open contacts are closed, the electronic controller 50 is enabled to control the AMV and RMV magnet valves for the truck. Each normally closed contact that has failed to close while the EBR is deenergized signifies that the normally open contact with which it is designed to move cooperatively has failed. By monitoring the contact feedback circuits, the electronic controller 50 can ascertain when any one or more of the normally open contacts have broken, welded or otherwise failed. In this manner, failure of any of the contacts is annunciated to the electronic controller.

A DC—DC converter 370, optionally housed in the electronics section 300, receives the 22–44 V dc (37 V dc nominal) from the battery of the railcar. It converts the 37 V dc to 15 V dc to power each amplifier circuit 310 and 320, each detector-driver circuit 330 and 340 and each transducer 230, 240 and 260. The 37 V dc nominal from the battery is also fed directly to the FETs in the detector-driver circuits 330 and 340. By turning on its FET, the comparator circuit in detector-driver circuit 330 causes that FET to energize the AMV magnet valve 210 using the power fed to it by the battery. The upper level detector-driver circuit 340 is operated in the same fashion. Battery power is thus used to drive the AMV and RMV magnet valves in the electropneumatic section 200 of the truck control unit.

Power is also supplied to the pressure switch 250 via the positive EMBAT terminal. The return EMBAT terminal connects to the return side of the EBR coil. Though laid out in the manner shown in FIG. 5, the pressure switch and the EBR operate cooperatively as just one of many possible means for granting the load compensation means exclusive control over the AMV and RMV magnet valves. Alternatively stated, controlled by the pressure switch, the EBR comprises just one of many possible means for giving the load compensation means exclusive control over the magnet valves. It should be noted that each of the foregoing means may be implemented using various other arrangements of the same parts or even different parts that together perform the same function as the previously described structure. The ensuing claims are therefore intended to encompass all of these mechanisms and any variations thereof.

The state of the EBR 350 is dictated by the operation of pressure switch 250. Normally closed while pressure in the brake pipe stays above the emergency level of approximately 90 psi, the pressure switch 250 allows power from the positive EMBAT terminal to flow to the coil of the EBR 350. When its coil is energized, the EBR 350 responds by closing its normally open contacts (and opening its normally closed contacts) thereby connecting the AMV and RMV magnet valves to their corresponding CPU in the electronic controller 50. With the EBR 350 in its normally energized state, it is in this posture that service braking and wheel slippage on the truck are normally controlled by the electronic controller 50 during non-emergency situations according to the aforementioned brake control process.

During emergency situations in which pressure in the brake pipe drops below the emergency level, the pressure switch 250 opens. By opening, the pressure switch disconnects the positive EMBAT terminal from the coil of the EBR 350 thereby causing the coil of the EBR to deenergize. The contacts of the EBR 350 then return to their default states thereby disconnecting the electronic controller 50 from the AMV and RMV magnet valves. The detector-driver circuits 330 and 340 of the electronic brake load weigh device thus assume exclusive control over the AMV and RMV magnet valves. With the EBR 350 in its deenergized state, the detector-driver circuits compensate for the load borne by the truck during emergency situations according to the previously recited predetermined criteria.

FIG. 6 illustrates an example of the predetermined criteria that the electronic brake load weigh device may employ during an emergency. The cross-hatched area indicates the desired range for pressure at the control port Ill for a truck bearing a fixed load. It also indicates the upper and lower threshold pressure levels according to which the detector-driver circuits will open or close the AMV and RMV magnet valves. For this illustration, it is assumed that the truck bears a load that yields an air spring pressure around 58 psi. For this air spring pressure, it is further assumed that the desired pressure at the control port 111 (i.e., emergency brake control pressure) lies in the range of 36.5 to 39 psi. The lower threshold pressure levels below which the AMV and RMV valves will deenergize are assumed at 35 and 39 psi, respectively. The upper threshold pressure levels above which the AMV and RMV will energize are assumed at 36.5 and 40 psi, respectively.

Starting at a point at which the pressure at the control port 111 of relay valve 110 is below 35 psi, the invention allows the AMV and RMV to assume, or at least remain in, their normally deenergized states (i.e., open and closed, respectively). This places the relay valve in the APPLY STATE. As pressure at the control port increases above 35 psi though not yet above 36.5 psi, the invention still allows the AMV to remain open, the RMV in this range still remaining closed. This illustrates the hysteresis range for the AMV. Once pressure at the control port rises above 36.5 psi though not yet above 40, the invention energizes (i.e., closes) the AMV, thereby placing relay valve 110 in the LAP STATE. Should the pressure rise above 40 psi, the invention will now energize (i.e., open) the RMV to reduce the pressure at the control port to the desired range of 36.5 to 39 psi. This places the relay valve in the RELEASE STATE. Even after the pressure reduces below 40 psi, the invention will not deenergize (i.e., close) the RMV until the pressure drops below 39 psi. This illustrates the hysteresis range for the RMV. As the pressure falls below 39 psi, the invention again deenergizes the RMV. Because both the AMV and RMV are now closed, the relay valve again assumes LAP STATE. Even if the pressure continues to fall, the invention will keep the RMV and AMV magnet valves closed, and the relay valve in the LAP STATE, until the pressure at the control port 111 falls below 35 psi. Should the pressure fall below 35 psi, the invention will again allow the AMV to open so as to again increase the pressure at the control port 111 thereby causing the relay valve to assume the APPLY STATE again.

Given this example in which the load on the air springs of the truck is fixed at about 58 psi, the invention tries to keep the pressure at the control port between 36.5 and 39 psi. Should the pressure slip out of that range, then the invention manipulates the AMV and RMV valves appropriately to bring it back within that range. It is this type of action that allows the invention to provide a load compensated pressure to the brake cylinders during an emergency in which the brake pipe pressure remains below the emergency level of 90 psi.

From FIG. 6 it is also apparent that other similar cross-hatched areas exist for other fixed levels of air spring pressure. This is indicated by the horizontally disposed bidirectional arrow. As air spring pressure changes due to the truck bearing more or less cargo or passengers, a corresponding cross-hatched area exists for each such air spring pressure. Represented in each such cross-hatched area will be the desired range for brake control pressure and the upper and lower threshold pressure levels according to which the detector-driver circuits will open or close the AMV and RMV magnet valves.

FIG. 6 also illustrates that for empty railcars the pressure at the control port 111 will be held within a range appropriate for empty rail vehicles. According to a third part of the predetermined criteria, the detector-driver circuits will selectively open and close the AMV and RMV magnet valves to hold the pressure at the control port within this range of pressure when the second conditioned signal indicates that the truck bears little or no load. For this illustration, it is assumed that an air spring pressure of near 47 psi is considered to be the lowest possible, i.e., the pressure indicative of an empty railcar. The brake control pressure that corresponds to this minimum air spring pressure lies in a range around 31 psi.

It should be apparent from FIG. 5 that the electronic brake load weigh device can be used to compensate for the load borne by the truck even when the electronic controller 50 is connected to the AMV and RMV magnet valves. This is because the detector-driver circuits 330 and 340 connect directly to the power and return lines of the AMV and RMV magnet valves, respectively, regardless of the state of the EBR 350. Should the electronic controller 50 operate the AMV 210 and RMV 220 valves in such a manner as to build pressure at the control port 111 of relay valve 110 contrary to the predetermined criteria, the detector-driver circuits will temporarily override the electronic controller 50 to compensate for the load borne by the truck by selectively energizing the AMV and RMV magnet valves according to the predetermined criteria.

Certain passenger transit authorities require that wheel slip control be activated during emergency brake applications. The electronic brake load weigh device may therefore include a wheel slip relay 360. It is primarily intended that this wheel slip relay work in cooperation with a safety timer circuit housed within the electronic controller 50. The safety timer circuit allows the electronic controller 50 to energize the wheel slip relay only for a limited time. In its normally deenergized (i.e., closed) state, the wheel slip relay 360 connects the pressure switch 250 to the coil of the EBR 350, as shown in FIG. 5. When energized via the WSSC terminals, the wheel slip relay 360 interrupts that connection by directly connecting the positive EMBAT terminal to the coil of the EBR 350. With its coil energized, the EBR responds by again closing its normally open contacts (and opening its normally closed contacts) thereby connecting the AMV and RMV magnet valves to their corresponding CPU in the electronic controller 50. By energizing the wheel slip relay 360, the electronic controller 50 can reestablish control over the AMV and RMV valves for the purpose of controlling the slipping of the wheels on the truck. During emergency braking, it is the timer safety circuit that assures that the braking effort will be reduced only for the limited time necessary to address the slipping of the wheels.

The electronic brake load weigh device can be used within and made a part of a variety of train brake control systems. The invention, for example, may be incorporated into electropneumatic brake control systems such as the R-142 and R-142A styles of the RT-5 Brake Control System that is designed for passenger transit and subway type trains. Depending on the particular brake control system in which the invention is used, certain modifications that should be apparent to persons skilled in the brake control art may be necessary. Any of the brake control systems featuring the invention will more reliably control the brakes of a railcar truck as compared to such brake control systems lacking the invention.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. An electronic brake load weigh device for use with a truck control unit of a rail vehicle, such truck control unit of the type having a relay valve for providing to a brake cylinder a pressure proportional to pressure impinging upon a control port of such relay valve, application and release valves by which to control pressure at such control port, a first transducer for converting pressure at such control port to a first feedback signal, a second transducer for converting pressure received from a load sensing system to a second feedback signal indicative of a load borne by a truck, a pressure switch that opens in response to a change in pressure in a trainline of such rail vehicle that is indicative of an emergency, and an electronic controller for controlling such application and release valves to implement service braking of wheels on a truck of such rail vehicle, said electronic brake load weigh device comprising:

(a) a first amplifier circuit for conditioning such first feedback signal received from such first transducer and producing therefrom a first conditioned signal;

(b) a second amplifier circuit for gain and offset of such second feedback signal received from such second transducer and producing therefrom a second conditioned signal appropriate for comparison with such first conditioned signal;

(c) a lower level detector-driver circuit for commanding such application valve (i) to close when said first conditioned signal is any one of equal to and greater than said second conditioned signal and (ii) to assume a normally open default state otherwise;

(d) an upper level detector-driver circuit for commanding such release valve (i) to open when said first conditioned signal is greater than said second conditioned signal by at least a preset amount and (ii) to assume a normally closed default state otherwise, said detector-driver circuits for commanding such application and release valves to hold pressure at such control port within a range appropriate for empty rail vehicles when said second conditioned signal indicates such truck bearing no load; and (e) a means for giving said detector-driver circuits exclusive control over such application and release valves, said giving means controlled by operation of such pressure switch such that such pressure switch (i) when opened compels said giving means to disconnect such electronic controller from such application and release valves thereby giving said detector-driver circuits exclusive control of such application and release valves whereby said detector-driver circuits compensate for such load borne by such truck during emergency braking and (ii) when closed empowers said giving means to connect such electronic controller to such application and release valves by which such service braking on such truck is normally controlled with said detector-driver circuits still enabled to compensate for such load borne by such truck during such service braking.

2. The electronic brake load weigh device as recited in claim 1 wherein said giving means includes an emergency relay that when energized by closure of such pressure switch closes a set of normally open contacts and opens a set of normally closed contacts, each of said normally open contacts when closed completes one conductive path that electrically interconnects such electronic controller with such application and release valves, each of said normally closed contacts when failing to close while said emergency relay is deenergized signifies that a corresponding one of said normally open contacts mechanically associated therewith has failed to open.

3. The electronic brake load weigh device as recited in claim 2 wherein failure of any of said contacts is annunciated to such electronic controller.

4. The electronic brake load weigh device as recited in claim 1 further includes a wheel slip relay that when energized interrupts a connection between such pressure switch and said emergency relay to energize said emergency relay, such electronic controller by energizing said wheel slip relay during said emergency permits such electronic controller to control such application and release valves for at least controlling slipping of such wheels on such truck.

* * * * *